United States Patent [19]

Sakamoto

[11] Patent Number: 4,499,391
[45] Date of Patent: Feb. 12, 1985

[54] END BRACKET FOR MOTOR

[75] Inventor: Masafumi Sakamoto, Kiryu, Japan

[73] Assignee: Japan Servo Co., Ltd., Tokyo, Japan

[21] Appl. No.: 416,933

[22] Filed: Sep. 13, 1982

[30] Foreign Application Priority Data

Dec. 28, 1981 [JP] Japan .................. 56-193056

[51] Int. Cl.³ .............................. H02K 3/42
[52] U.S. Cl. ..................... 310/89; 310/256; 310/51
[58] Field of Search ................ 310/51, 89, 256

[56] References Cited

U.S. PATENT DOCUMENTS

| 3,527,969 | 9/1970 | Papst | 310/51 |
| 4,164,673 | 8/1979 | Mazzorana | 310/89 |
| 4,233,535 | 11/1980 | Barone | 310/256 |
| 4,347,457 | 8/1982 | Sakamoto | 310/256 |

Primary Examiner—Donovan F. Duggan
Attorney, Agent, or Firm—James E. Nilles

[57] ABSTRACT

An end bracket for a motor comprising an inner wall and an outer wall. The inner wall is formed from a thin magnetic shielding material and the outer wall is formed from a non-magnetic material. The inner wall comprises: a larger-diameter cylindrical part having an outside diameter substantially equal to that of the stator core of a motor and further having an inner end in contact with said stator core; a smaller-diameter cylindrical part coaxial with the larger-diameter cylindrical part and having an outside diameter substantially equal to that of the rotor of the motor and further having an inner end facing said rotor across a gap; and an end disk part integrally connected to the outer ends of these cylindrical parts respectively. A plurality of small projections are formed on the end disk part of the magnetic shield to project in the opposite direction to the cylindrical parts so that the height of each of the small projections is substantially equal to the thickness of the outer wall of non-magnetic material, and the small projections are buried in said outer wall in order to connect the magnetic shield and the outer wall into a unitary end bracket.

5 Claims, 6 Drawing Figures

END BRACKET FOR MOTOR

BACKGROUND OF THE INVENTION

1. Field of the Invention

The present invention relates to an end bracket for a motor.

2. Description of the Prior Art

Since conventional motor end brackets are generally made of non-magnetic materials, they present the problem that magnetic flux leaks out to the outside of the motor through the end brackets, resulting in adverse effects on peripheral functions.

SUMMARY OF THE INVENTION

It is, therefore, an object of the present invention to provide an end bracket for a motor capable of preventing the magnetic flux of the motor from passing through the end bracket and leaking out to the outside.

The end bracket for a motor according to the present invention has an inner wall formed from a thin magnetic shielding material and an outer wall formed from a non-magnetic material connected with the magnetic shielding material. Said inner wall comprises: a larger-diameter cylindrical part whose outside diameter is substantially equal to that of the stator core of the motor and whose inner end is in contact with the stator core; a smaller-diameter cylindrical part coaxial with the larger-diameter cylindrical part and whose outside diameter is substantially equal to that of the rotor of the motor and whose inner end faces the rotor across a gap; and an end disk part integrally connected to the outer ends of these cylindrical parts respectively.

Other objects and features of the present invention will be apparent from the following description taken in connection with the accompanying drawings.

DESCRIPTION OF THE PREFERRED EMBODIMENTS

Figure 1:
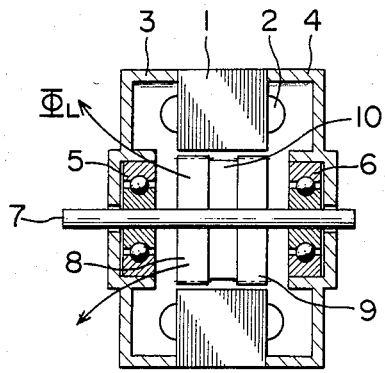
FIG. 1 is a sectional view of a motor having a conventional end bracket.

FIG. 1 shows a motor having a conventional end bracket. A stator core 1 is wound with a plurality of stator windings 2, and end bracket main bodies 3, 4 are integrally fastened to the stator core 1 by means of a fastening bolt, not shown. Reference numerals 5, 6 denote bearings respectively. To a rotor shaft 7, pole pieces 8, 9 are integrally secured, and a permanent magnet 10, axially magnetized, is placed between the pole pieces 8 and 9.

A plurality of pole teeth are disposed on the inner peripheral part of the stator core 1 at the same pitch as the pole teeth provided on the pole pieces 8, 9 of the rotor facing thereto. When current is supplied to the stator windings 2 in a given order, the rotor is rotated by the attractive or repulsive forces between the magnetic poles acting between the pole teeth provided on the inner peripheral part of the stator core 1 and the magnetic teeth provided on the pole pieces 8, 9 of the rotor, and the magnetic flux generated from the permanent magnet 10 mounted on the rotor functions so as to increase the rotational force.

However, because the magnetic flux generated from the permanent magnet 10 has a leakage magnetic flux, shown by $\Phi L$ in FIG. 1, leaking out to the air from the end surfaces of the pole pieces 8, 9 besides the main magnetic flux passing through from the pole pieces 8, 9 and the stator core 1 facing to the pole teeth provided on the peripheries of the pole pieces 8, 9 through a gap, and because the end bracket main bodies of a typical conventional motor are made of diecasting aluminum or the like, which is non-magnetic, the conventional motor presents the problem that the magnetic flux penetrating through the end bracket main bodies leaks out to the outside of the motor.

When the motor of such a structure is employed for certain kinds of application, e.g., for controlling the magnetic head of a magnetic disk driving apparatus, the problem arises that the magnetic flux leaking out to the outside of the motor interferes with the magnetic disk and the magnetic head, causing them to malfunction.

In order to eliminate the above-mentioned problem, it has been proposed that a magnetic shielding plate be provided between the motor and the parts subjected to the interference, or that the end bracket main body itself be formed from a magnetic material so that the leakage magnetic flux is passed therethrough as a magnetic path in order to prevent the magnetic flux from leaking out to the outside. Providing the magnetic shielding plate outside the motor, however, causes the number of parts to increase, and the installation of the magnetic shielding plate is restricted by space. In addition, if the end bracket main body itself is formed from a magnetic material, the weight thereof increases, and processing becomes difficult. Therefore, such measures cannot sufficiently solve the problem.

Figure 2:
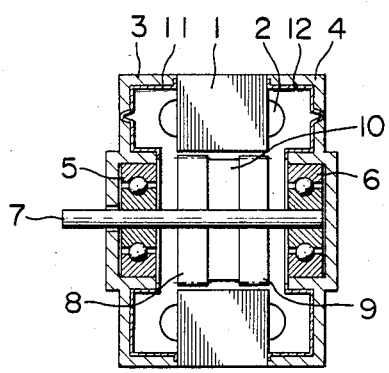
FIG. 2 is a sectional view of a motor having an end bracket according to the present invention.

FIG. 2 shows a motor equipped with a novel end bracket capable of solving the conventional problem as mentioned above. The same parts as shown in FIG. 1 are designated by the same reference numerals. In the present invention, magnetic shields 11, 12 made of a magnetic material are connected to the inner walls of the end bracket main bodies 3 and 4. An outer cylindrical part 13-1 is provided on the periphery of each magnetic shield, and a flange part 13-1-a provided at the inner end surface is brought into contact with the outer peripheral part of the stator core 1. Moreover, an inner cylindrical part 13-4 is provided on the inner peripheral part of each magnetic shield, and a flange part 13-4-a provided at the inner end surface is opposed to either one of the pole pieces 8, 9 of the rotor.

Figure 3A:
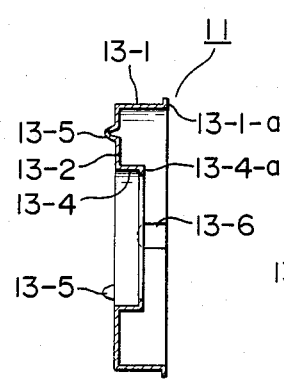
FIGS. 3(a) and 3(b) are a vertical sectional view and a side elevational view of a magnetic shield used in the end bracket according to the present invention respectively.
Figure 3B:
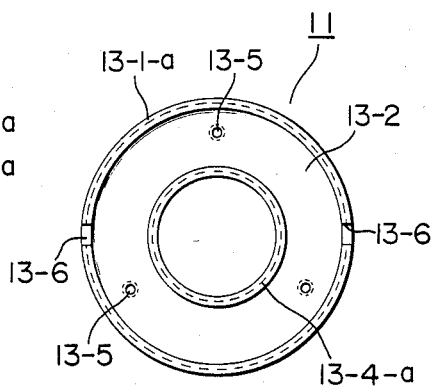
Figure 3C:
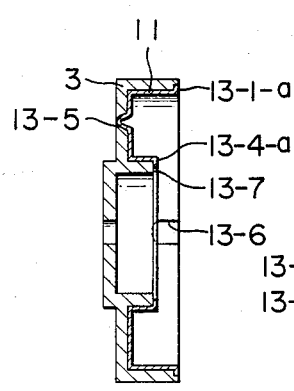
FIGS. 3(c) and 3(d) are a vertical sectional view and a side elevational view, respectively, of the end bracket according to the present invention.
Figure 3D:
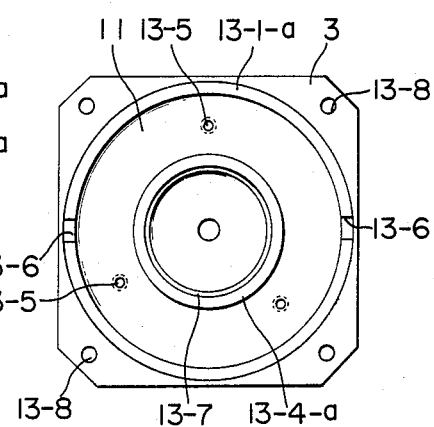

FIGS. 3(a) and 3(b) are a vertical sectional view and a side elevational view of a magnetic shield respectively, and FIGS. 3(c) and 3(d) are a vertical sectional view and a side elevational view of the end bracket according to the present invention integrally formed with the magnetic shield respectively. The outside diameter of the outer cylindrical part 13-1 of each of the magnetic shields 11, 12 is substantially equal to that of the stator core 1, while the outside diameter of the inner cylindrical part 13-4 is substantially equal to that of each of the pole pieces 8, 9 of the rotor, and the outer cylindrical part 13-1 and the inner cylindrical part 13-4 are formed integrally with each other projecting from an end disk part 13-2 in the same direction. In addition, a plurality of small projections 13-5 are formed on the end disk part 13-2 so as to project in the opposite direction to the projecting direction of the cylindrical parts 13-1 and 13-4 so that the projecting height thereof is made substantially equal to the thickness of the outer wall of each of the non-magnetic end bracket main bodies 3, 4, and moreover a plurality of notches 13-6 are provided near the end surfaces of the outer cylindrical part 13-1.

FIGS. 3(c) and 3(d) show the state where the magnetic shield as an inner wall is integrally formed with the end bracket main body 3 as an outer wall part made of a non-magnetic material, e.g., an aluminum alloy and having a bearing housing part 13-7 and lug parts provided with fastening bolt bores 13-8 respectively. In other words, according to the present invention, the small projections 13-5 projecting from the end disk part of the magnetic shield and the notches 13-6 are buried in the aluminum alloy end bracket main body 3, thereby to form the end bracket main body 3 and the magnetic shield integrally with each other.

In the motor equipped with the end bracket employing as the inner walls the magnetic shield according to the present invention, the leakage magnetic flux from the pole pieces of the rotor is absorbed in the magnetic shield as shown in FIG. 2 and passed through the stator core 1 with which the flange part 13-1-a of the outer cylindrical part 13-1 is brought into contact, so that leakage to the outside of the motor decreases.

As will be fully understood from the foregoing description, according to the present invention, it is possible to largely reduce leakage of magnetic flux without any increase in weight by integrally forming the outside cylindrical part 13-1, the inner cylindrical part 13-4 and the end disk part 13-2 of each magnetic shield and further forming the end bracket main body 3 from an aluminum alloy integrally with the magnetic shield as an inner wall.

What is claimed is:

1. In an electric motor that comprises a rotor with a shaft that defines an axis and a stator core within which the rotor coaxially rotates, an end bracket whereby a bearing for said shaft is supported in coaxial relation to the core, said end bracket comprising:
   (A.) an outer member of light, substantially rigid material,
      (1) having one portion that is connected with the core and projects in an axially outward direction therefrom, and
      (2) having another portion that provides a seat wherein said bearing is supported in fixed coaxial relation to the core; and
   (B.) a magnetic shielding member of magnetically permeable material, disposed inwardly adjacent to said outer member and having
      (1) a larger diameter substantially cylindrical wall portion which is coaxial with the core and has an axially inner end abutting the core,
      (2) a concentric smaller diameter cylindrical wall portion surrounding said other portion of the outer member, having an axially outer end that is substantially radially opposite the axially outer end of the larger diameter cylindrical wall portion and having an axially inner end that is axially spaced from the core, and
      (3) a concentric annular wall portion that extends radially between the axially outer ends of said cylindrical wall portions and connects them.

2. The end bracket of claim 1, further characterized by:
   (C.) a plurality of protuberances on one of said members, received in closely fitting apertures in the other of said members to secure said magnetic shielding member in inwardly adjacent relation to said outer member and connect said members into a unitary end bracket.

3. The end bracket of claim 1, further characterized by:
   said larger diameter cylindrical wall portion having a radially projecting circumferential flange around its axially inner end that is flatwise engaged against a surface on the core that faces in said axially outward direction.

4. The end bracket of claim 3 wherein said flange projects radially outwardly and is received in a closely fitting radially inwardly opening groove in a face of the outer member that opposingly engages said surface of the core.

5. The end bracket of claim 4, further characterized by:
   a plurality of protuberances on said annular wall portion, projecting in said axially outward direction and received in closely fitting apertures in the outer member to cooperate with said flange in securing said magnetic shielding member in inwardly adjacent relation to said outer member and connect said members into a unitary end bracket.

* * * * *